US011238573B2

(12) United States Patent
Finlayson et al.

(10) Patent No.: US 11,238,573 B2
(45) Date of Patent: Feb. 1, 2022

(54) REGULARIZED DERIVATIVE OPERATORS FOR IMAGE PROCESSING SYSTEM AND METHOD

(71) Applicant: Apple Inc., Cupertino, CA (US)

(72) Inventors: Graham Finlayson, Norwich (GB); Mark Drew, Burnaby (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/900,653

(22) Filed: Jun. 12, 2020

(65) Prior Publication Data

US 2020/0394776 A1    Dec. 17, 2020

(30) Foreign Application Priority Data

Jun. 13, 2019   (GB) ..................................... 1908514

(51) Int. Cl.
*G06T 5/00*    (2006.01)

(52) U.S. Cl.
CPC .............. *G06T 5/009* (2013.01); *G06T 5/001* (2013.01)

(58) Field of Classification Search
CPC ...................... G06T 5/009; G06T 5/001; G06T 2207/20081; G06T 2207/20208; G06T 5/20; G06T 5/008
(Continued)

(56) References Cited

U.S. PATENT DOCUMENTS

| 8,705,881 B2 * | 4/2014 | Wang ....................... G06T 5/003 382/255 |
| 8,913,845 B2 * | 12/2014 | Finlayson ............... G06T 5/002 382/279 |

(Continued)

FOREIGN PATENT DOCUMENTS

| GB | 2480156 A | * 11/2011 | ............... G06T 5/00 |
| WO | 2020099893 A2 | 5/2020 | |

OTHER PUBLICATIONS

Bhat, et al., "Fourier Analysis of the 2D screened Poisson Equation for Gradient Domain Problems," European Conference on Computer Vision, 114-128, 2008.
(Continued)

*Primary Examiner* — Ishrat I Sherali
(74) *Attorney, Agent, or Firm* — Blank Rome LLP

(57) ABSTRACT

Devices, methods, and non-transitory program storage devices are disclosed herein to provide improved image processing, the techniques comprising: obtaining an input image and target image data, and then calculating derivatives for the target image data using a regularized derivative kernel operator. In some embodiments, the regularized operator may comprise the following operator: [−1 (1+ε)], wherein ε may be a controllable system parameter and preferably is independent of the particular type of image processing being applied to the image. In some embodiments, the techniques may find look-up table (LUT) mappings or analytical functions to approximate the derivative structure of the target image data. Finally, the techniques disclosed herein may generate an output image from the input image based on attempting to closely approximate the calculated derivatives for the target image data. In preferred embodiments, by controlling the mapping, e.g., using regularization techniques, halos and other image artifacts may be ameliorated.

20 Claims, 6 Drawing Sheets

(58) Field of Classification Search
USPC .................................................. 382/254, 274
See application file for complete search history.

(56) References Cited

U.S. PATENT DOCUMENTS

| | | | | |
|---|---|---|---|---|
| 9,129,388 | B2* | 9/2015 | Finlayson | G06T 5/40 |
| 9,262,815 | B2* | 2/2016 | Tezaur | G06T 5/003 |
| 9,626,744 | B2* | 4/2017 | Finlayson | G06T 5/009 |
| 2011/0052029 | A1* | 3/2011 | Connah | H04N 1/3871 |
| | | | | 382/131 |
| 2012/0263377 | A1* | 10/2012 | Finlayson | G06T 5/001 |
| | | | | 382/162 |
| 2013/0136378 | A1* | 5/2013 | Finlayson | G06T 5/00 |
| | | | | 382/279 |
| 2020/0394776 | A1* | 12/2020 | Finlayson | G06T 5/001 |

OTHER PUBLICATIONS

Connah, et al., "Spectral edge: gradient-preserving spectral mapping for image fusion," J. Opt. Soc. A., 2384-2396, 2015.

Finlayson, et al., "Lookup-Table Based Gradient Field Reconstruction," IEEE Transactions on Image Processing, 2827-2836, 2011.

Golub, et al., "Matrix Computations," 4th Edition, The Johns Hopkins University Press, 2013.

Kazufumi, et al., "Inverse Problems: Tikhonov Theory and Algorithms," World Scientific, 2014.

Meylan, et al., "Model of retinal local adaptation for the tone mapping of color filter array images," J. Opt. Soc. Am. A., 2807-2816, 2007.

Olkin, et al., "The distance between two random vectors with given dispersion matrices," Linear Algebra and its Applications, 257-263, 1982.

* cited by examiner

REGULARIZED DERIVATIVE OPERATORS FOR IMAGE PROCESSING SYSTEM AND METHOD

CROSS-REFERENCE TO RELATED APPLICATION

This application claims priority to the commonly-owned Great Britain patent application bearing serial number GB 1908514.1 and filed Jun. 13, 2019 ("the '514 application"). The '514 application is also hereby incorporated by reference in its entirety.

TECHNICAL FIELD

This disclosure relates generally to the field of digital image processing. More particularly, but not by way of limitation, it relates to techniques for approximating the derivative structure of a target image as a function of an input image.

BACKGROUND

In image processing, there are often times when it is desirable to alter the appearance of an input image. For example, it may be desirable to reproduce a particular effect or apply a particular process to an input image by using some information from target image data (e.g., image pixel data or gradient values related to pixel data of a target image).

FIG. 1, shows an input high dynamic range image 100 processed according the Naka-Rushton non-linear processing model. (See, e.g., L. Meylan, D. Alleysson, S. Susstrunk, "Model of retinal local adaptation for the tone mapping of color filter array images", J. Opt. Soc. Am. A., 2807-2816, 2007, for an explanation of the Naka-Rushton formula.) The original image 100 is shown with a gamma of 2.2 applied. The image 100 looks dark because, in reality, the ratio of the brightest pixel to the darkest pixel is on the order of thousands (or tens of thousands) to one, but an electronic display (or ink on paper) cannot typically reproduce such a dynamic range. For example, a printed page can typically only display a dynamic range of about 100:1.

To get around this problem, a process called dynamic range compression (DRC) may be used in order to attempt to map the high dynamic range of the image to a smaller interval so that all the detail can be displayed. As such, image 150 of FIG. 1 shows the result of the simplest Naka-Rushton dynamic range compression algorithm (which carries out local tone mapping) being applied to image 100. After the DRC processing, additional detail may be seen in many parts of image 150 (as compared to image 100), but there are also strong halos remaining in various parts of image 150 after the processing, e.g., around the window and the lamp.

Thus, it would be beneficial to have methods and systems in which some aspect of target image data, e.g., the derivative structure of a target image, can be applied to an input image, e.g., by using a mapping function, to alter the appearance of an input image and generate an improved output image. It may also be beneficial to reduce halos or other artifacts during such image processing operations.

SUMMARY

Devices, methods, and non-transitory program storage devices are disclosed herein to provide methods and systems in which the derivative structure of target image data can be reproduced to enhance an input image, while at the same time reducing halo artifacts and the like. It will be appreciated that the target image data need not be an image, and could instead be, e.g., a gradient of a target image.

According to some embodiments, a method is disclosed, comprising: obtaining input image and target image data; and then calculating derivatives for the target image data using a regularized derivative kernel operator. In some embodiments, the regularized operator may comprise the following operator: $[-1\ (1+\varepsilon)]$, wherein $\varepsilon$ may be a controllable system parameter and preferably is independent of the particular type of image processing being applied to the image.

In some embodiments, the method may find look-up table (LUT) mappings, applied to the input image, to approximate the derivative structure of the target image data. In preferred embodiments, the LUT mappings are specifically configured to "approximate" the derivative structure of the target image data, rather than "reproduce" the output structure exactly. Instead, by controlling the mapping, e.g., using regularization techniques, the goal is that the output image actually looks like a better version of the target image, e.g., wherein halos or other artifacts are ameliorated.

Finally, the method may proceed by generating an output image from the input image, wherein the output image has derivatives determined based on the calculated derivatives for the target image data. For example, in some cases, the output image may be generated to have a derivative structure that most closely matches the calculated derivatives for the target image data. In some cases, determining the derivative structure of an output image may comprise solving a minimization operation attempting to match a derivative structure of the input image to the derivative structure of the target image data.

In some embodiments, calculating the derivatives may comprise: calculating x-derivatives of the target image data by differentiation using a derivative kernel $[-1\ (1+\varepsilon)]$, where $\varepsilon>0$; calculating y-derivatives of the target image data by differentiation using a derivative kernel $[-1\ (1+\varepsilon)]^T$, where $\varepsilon>0$; and generating the output image having derivatives based on the so-calculated x-derivatives and y-derivatives, e.g., the calculated derivatives may represent the most closely matching derivatives to the so-calculated x-derivatives and y-derivatives.

The techniques described herein may also be used for other applications, such as LUT reintegration, Poisson-type solving frameworks, mixed illuminant white-balancing, and other similar applications.

The techniques described herein may be implemented on a Field Programmable Gate Array (FPGA) or Application-Specific Integrated Circuit (ASIC) device and may operate in real-time or substantially real-time. The techniques described herein may be implemented on data captured using a multispectral image signal processor (ISP), e.g., using a sensor having Red, Green, Blue and Infrared sensing pixels (i.e., an "RGB-IR" sensor), or using a sensor having Red, Green, Blue and unfiltered (i.e., white) sensing pixels (i.e., an "RGB-W" sensor).

Various non-transitory program storage device embodiments are disclosed herein. Such program storage devices are readable by one or more processors. Instructions may be stored on the program storage devices for causing the one or more processors to perform any of the image white balancing techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

Figure 1:
FIG. 1 illustrates exemplary images showing the application of dynamic range compression techniques.
Figure 1:

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Look-Up Table Reintegration

To provide some background on the techniques that will be described herein, the process of LUT reintegration will now be discussed in greater detail. Look-up table reintegration, in its simplest form, finds a one-to-one mapping from input image data (which could be scalars values or vectors) to an output value, such that the gradient field of the output image approximates a target gradient field. Because of the one-to-one nature of the mapping, there can be no new spatial structure introduced into the output image that wasn't present in the input image.

However, some 'global' variants of LUT reintegration also limit the degree to which spatial processing can be approximated. Thus, in some variants, it was also envisioned that the LUT applied at a given location in an image could vary spatially. However, even the spatially-varying implementations cannot always well approximate strong spatial processing (e.g., of the kind found in many image processing algorithms, including Dynamic Range Compression). Indeed, if the LUT approach is used to approximate strong spatial processing then—even though it is by design robust to spatial artifacts—the LUT method can still introduce detail that is undesired.

At the heart of the problem is the inherently ill-posed nature of LUT reintegration. In some cases, ill-posed problems are made more well-posed by regularizing the problem. For example, a solution may be found that adheres to some global property, e.g., that the magnitude of the solution is bounded. However, it has now been identified that it is the nature of fitting the derivatives themselves that can cause many of the problems. According to various embodiments described herein, through an approach based on an 'at a pixel'-style (i.e., completely local) regularization, a new derivative operator has been devised. With respect to this new definition of differentiation, the performance of LUT reintegration has been found to often improve dramatically. The techniques can also be extended to classical gradient domain problems (e.g., those solved using Poisson-type solvers).

Turning now to a more detailed discussion of LUT reintegration, if $I(x,y)$ denotes a (in this case) scalar image and $P^o(I(x,y))$ a polynomial expansion, where 'o' is the order of the polynomial. For example, $P^3(I(x,y))=[I(x,y)(I(x,y))^2 (I(x,y))^3])$ or $[I(x,y) (I(x,y))^2 (I(x,y))^3$ ones$(x,y)]$, depending whether an offset component is allowed (wherein, at every location, ones$(x,y)=1$). A linear combination with coefficients $\underline{c}$ of a polynomial expansion of an image is written: $P^3(I(x,y))\underline{c}$.

Note, the image could have a vector of components (e.g., RGB color) at each point, and the polynomial could have cross-channel components. These are straight-forward extensions that do not alter the underlying algorithm. So, here and throughout the present application, techniques are discussed that map a scalar image to a scalar output, but the method is always and straightforwardly extensible to vector images.

For a given target gradient field $\nabla J(x,y)$, the LUT approach minimizes:

$$\min_{\underline{c}} \|\nabla P^o(x,y)\underline{c} - \nabla J(x,y)\| \qquad \text{(Eqn. 1)}.$$

Regarding Eqn. 1, there are three points to consider. First, $\nabla J(x,y)$ denotes an approximation of a 'gradient field' arrived at via some image processing algorithm. That is, there is a derived x- and y-approximation of a derivative at each point. However, there may or may not be a real image, J, whose actual derivatives match the target gradient field (i.e., it may not be possible to exactly reintegrate $\nabla J(x,y)$). Thus, mathematically, the gradient field may be said to be non-integrable. Second, the minimization set forth in Eqn. 1 is not affected by the integrability question. Indeed, because the gradients of the polynomial expansion of the image are calculated, if this coefficient vector is applied to the polynomial images themselves (i.e., and not the gradient), the result must be an integrable image.

Lastly, the derivatives of the function ones$(x,y)$ will always be 0, so including the offset in the polynomial expansion doesn't add anything to the process. Note, the techniques disclosed herein propose a new derivative-type operator and, with respect to this operator, the offset term can actually be important and useful.

Look Up Table Reintegration with Regularization

The direct solution to Eqn. 1 above (which can be found in closed-form) can yield a coefficient vector, $\underline{c}$, whose components are very large, and this implies the image $P^o(x,y)\underline{c}$ will have also have a large norm. That is, the input image $I(x,y)$, from which $P^o(x,y)\underline{c}$ is calculated, has a 'bounded' norm, but there is no guarantee that the recovered image is similarly-bounded. The input image could have values in the interval [0,1], but the output image interval could be [−A,B], where A and B are large positive numbers. Linear systems of equations can have large norm solutions when the equations are instable, in a mathematical sense. Specifically, small perturbations to the data (in this case, $\nabla J(x,y)$) can result in large changes in the recovered image.

If it is desired to bound the solution to a set of equations, e.g., to make the optimization of Eqn. 1 more stable, regularization theory may be used. The minimization with a regularization constraint on the norm of the solution image found can then be written as:

$$\min_{\underline{c}} \|\nabla P^o(x,y)\underline{c} - \nabla J(x,y)\| + \lambda \|P^o(x,y)\underline{c}\| \quad \text{(Eqn. 2)},$$

where $\lambda$ is a user-defined variable, $\lambda > 0$. If a large $\lambda$ is used, then the norm (or magnitude) of $P^o(x,y)\underline{c}$ dominates Eqn. 2, and a solution, $\underline{c}$, may be found, such that this norm is small. However, in consequence, the error (i.e., the first term in Eqn. 2) increases. Conversely as $\lambda \to 0$, then the fitting error is minimized, but the magnitude of the solution image can become large. When $\lambda = 0$, Eqn. 2 reduced to be the same as Eqn. 1. For different values of $\lambda$, the fitting error can be plotted against the norm of the solution. This plot may be characterized as having an 'L-shape.' Choosing a solution close to the origin often provides a good compromise solution.

Spatially-Varying Look-Up Table Reintegration with Regularization

One spatially-varying implementation of LUT reintegration simultaneously solves for k coefficient vectors that then calculate the combination of k polynomials. The spatially-varying aspect of the computation is encoded in k basis functions, $B_i(x, y)$, $i \in \{1, 2 \ldots k\}$, that define the linear combination of the k polynomials that is applied per pixel. The following Eqn. 3 may then be minimized:

$$\min_{\underline{c}_i} \sum_{i=1}^{k} \|\nabla P^o(x, y) B_i(x, y) \underline{c}_i - \nabla J(x, y)\| + \lambda \|P^o(x, y) B_i(x, y) \underline{c}_i\|. \quad \text{(Eqn. 3)}$$

Once Eqn. 3 has been minimized, the approximate image (also referred to herein as an output image), approx(x, y), which has the derivatives closest matching to $\nabla J(x,y)$, may be calculated as:

$$\text{approx}(x, y) = \sum_{i=1}^{k} P^o(x, y) B_i(x, y) \underline{c}_i. \quad \text{(Eqn. 4)}$$

As may now be understood, according to some embodiments, the approximated image (i.e., output image) is generated based on the calculated derivatives for the target image data (i.e., $\nabla J(x,y)$). For example, it may be desirable that the derivative structure of the approximated image approximates the calculated derivatives for the target image data. In some embodiments, such as those described above with reference to Eqns. 1-4, the approximated image is generated to have a derivative structure that most closely matches the calculated derivatives for the target image data. In the exemplary Eqns. 1-4 above, this closest match is found by solving a minimization operation attempting to match a derivative structure of the input image to the derivative structure of the target image data. It is to be understood that other mathematical approaches and solver frameworks may also be employed to determine the desired derivative structure for the output image that will approximate the derivative structure of the target image data, as suited to the needs of a given implementation.

Here, and throughout this description, the use of LUTs and LUT mappings is often referenced. That is to say, the input image may be mapped to generate the output image via a weighted sum of the outputs of LUTs (e.g., LUTs indexed by input values). However, as in Eqns. 3 and 4, above, the LUTs might alternatively be codified as one or more analytic functions (e.g., polynomial expansions of the input image). It is to be understood that the implementation of these techniques via LUT mappings is merely an exemplary choice that could be used according to some embodiments.

Dynamic Range Compression Example

Figure 2:
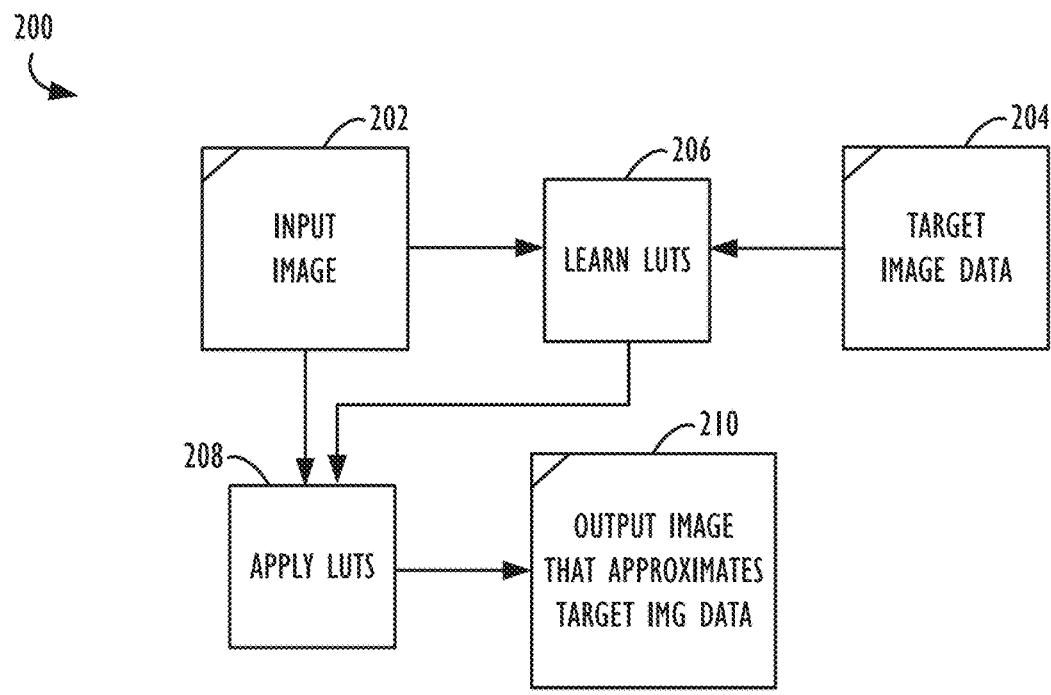
FIG. 2 illustrates an exemplary workflow for approximating an output image using a LUT mapping, according to one or more embodiments.

Turning now to FIG. 2, an exemplary workflow 200 for approximating an output image using a LUT mapping is shown, according to one or more embodiments. In particular, the workflow 200 is given input image 202 and an target image data 204. The goal of workflow 200 is to approximate the target image data by calculating a third image 206, such that this third image 206 is a spatially-varying LUT mapping from the input image that best approximates the derivatives of the target image data in the output image (e.g., according to Eqn. 3, above). The output image 210 that approximates the target image data 204, may then be calculated, e.g., by applying the learned LUT at Step 208 via Eqn. 4, above.

Adopting the workflow shown in FIG. 2, a look-up-table reintegration solution may be generated. Here, for basis functions, the first 10 terms in the Discrete Cosine Basis expansion may be used and, in Eqn. 3, I(x,y) and J(x,y) are the logarithm of the image values. To display the calculated output, the data may be exponentiated, applying a 2.2 gamma. The "Learn LUT" function 206 could also, e.g., take thumbnails (i.e., downscaled versions) of the input and output images as inputs in order to reduce processing requirements.

Figure 3:
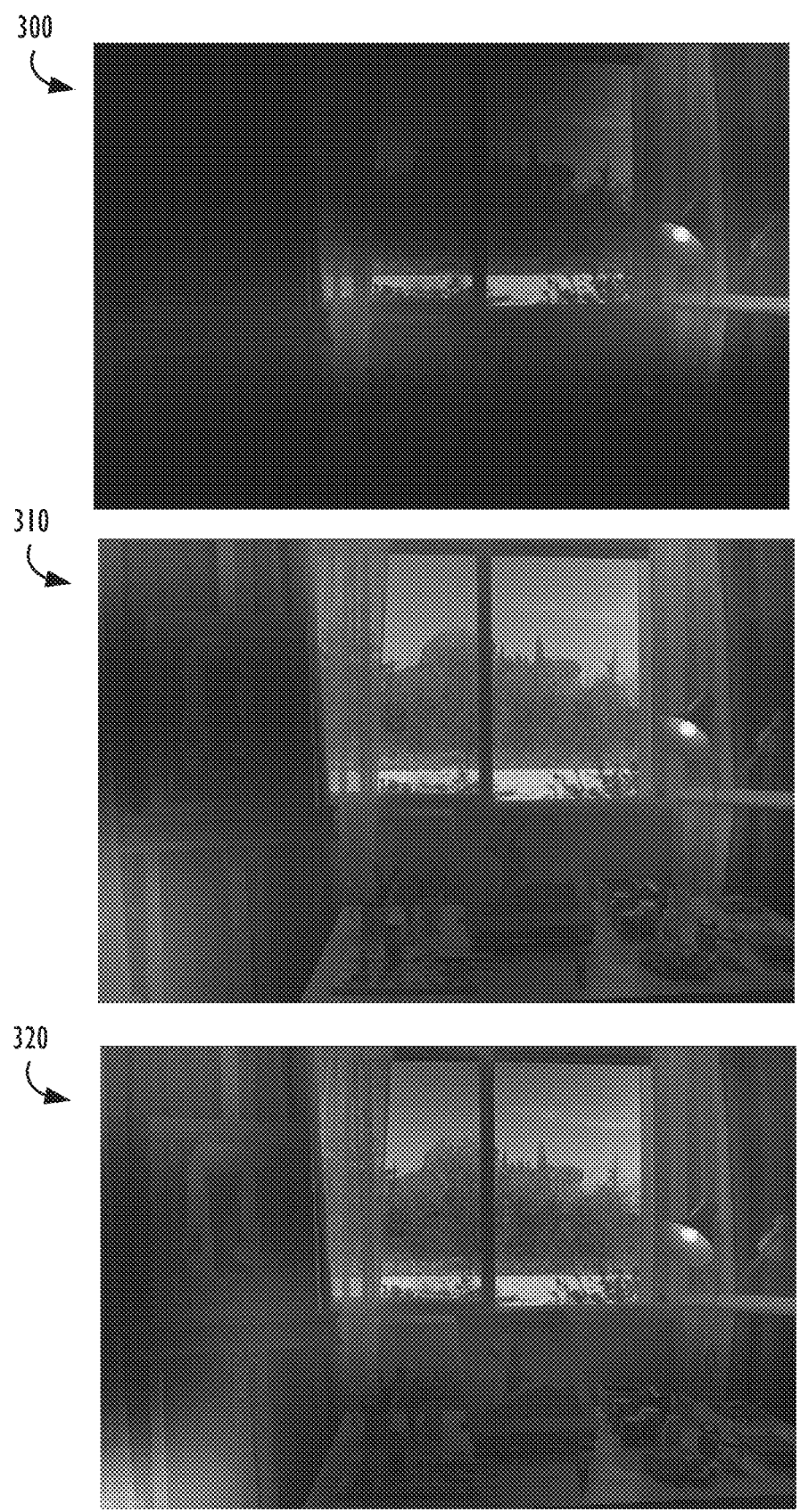
FIG. 3 illustrates exemplary images showing the application of LUT derivative approximation image processing techniques.

The result of 'mapping' image 100 of FIG. 1 to image 150 of FIG. 1 by a spatially-varying LUT using the workflow 200 of FIG. 2 is shown in image 300 of FIG. 3 (where the $\lambda$ in Eqn. 3 was chosen to be small). However, there are some inaccuracies in this result, e.g., due to the fact that areas that are black are actually large negative numbers that are clipped to 0.

Potentially, the regularization term used was too small, meaning that the norm of the recovered image is too high. In fact, the derivatives are well-approximated, but the recovered image looks somewhat unnatural. Increasing the $\lambda$ value somewhat results in the image 310 shown in FIG. 3. Image 310 also has some inaccuracies. For example, image 310 is closer to the desired output (i.e., image 150 in FIG. 1) but is still a poor fit of the data. Although this image still has inaccuracies, there are aspects that are better than the original target output image (i.e., image 150 in FIG. 1). For example, there are no halos around the lamp on the desk.

As may now be understood, while the LUT approach has removed the most egregious haloing effects, the approximation is still somewhat dull and unappealing. One potential way to bring out more detail in the approximation is to add either more polynomial terms and/or more basis functions. Image 320 in FIG. 3 is created using the first 21 terms in the Discrete Cosine Basis expansion, with an order-2 polynomial expansion. Numerically, the output fidelity is closer to the original output (i.e., in terms of gradients), but there still many undesirable spatial artifacts. However, image 320 does not seem to be improved overall compared to image 310 in FIG. 3.

The fact that spatial artifacts remain in image 320 is not surprising. Indeed, if a full Discrete Cosine Basis were used, then the solution returned by the LUT approach would approximate the non-LUT solution. It is well-known that halos, bleeding, and bending artifacts result from Poisson reintegration process. And, as mentioned earlier, the solution is seeking to approximate the output from the Naka-Rushton Dynamic Range Compression algorithm, so that the output image retains the good dynamic range compression—but without the spatial artifacts.

Another reason for the artifacts is because it is a gradient field reintegration problem. Not only is the problem inherently ill-posed but, as alluded to above, gradients do not exist everywhere in an image. When the parts of the image where there are zero (or close to zero) gradients are reintegrated, they are, in effect, in-filled from the (sparse) derivatives that do exist. In this way, information present in one part of the image (i.e., the derivatives) is propagated to another part of the image. Also, during this propagation, small errors can accumulate and become bigger. Indeed, the inherent sparseness of gradient fields compounds the reintegration problem and, on their own, account for some of the artifacts present in the reintegrated images (e.g., large, low-frequency bending artifacts).

Discrete Differentiation

Regularization is typically defined relative to that which is being solved, e.g., in the example described above, the coefficient vector $\underline{c}$ (or the recovered image $P^o(I(x,y))\underline{c}$). While this standard type of regularization should be part of the problem formulation, according to the embodiments disclosed herein, the differential operator itself may be changed. In the examples below, a novel derivative operator is determined by thinking about regularization "at the pixel level." In discrete image processing, derivatives may be calculated by convolving a signal with a derivative mask. This mask may then be multiplied with the signal and summed up at each pixel location (i.e., convolved). The results of this process are the discrete derivatives.

In some embodiments disclosed herein, a new derivative operation is used, which will also be referred to herein as an "epsilon derivative." Traditionally, a derivative kernel (or mask) that may be used is: [−1 1], whereas an exemplary epsilon derivative operator kernel that may be used is: [−1 (1+∈)].

According to some such embodiments, a derivative operator matrix, D, may be defined. Each row of matrix D may have two values, i.e., [−1 1], −1, along the diagonal and 1 at the next diagonal component. If a 1-dimensional signal is represented by the n-component vector $\underline{v}$, then its derivative may be denoted D$\underline{v}$, and D is an N×N matrix.

In some cases, the treatment of pixels at the edge of images may also be important (as there may not necessarily be enough pixel values to calculate the full set of pixel mask values or the discrete derivatives). Thus, in some cases, assumptions are made to estimate or guess the value of the image outside the boundary. Common assumptions made include assuming the values outside the edge of the image are zero (i.e., the homogeneous Dirichlet condition) or that the values are the same as their neighboring 'in-image' value (i.e., the homogeneous Neumann assumption). As long as some reasonable assumption has been made about the boundary, it will be possible to calculate the inverse $D^{-1}$ of the differentiation matrix, D. As will be explained in further detail, this ability to calculate $D^{-1}$ will be exploited in the derivations described below.

Deriving the Epsilon-Derivative Operator

Regularization, as described herein, seeks a solution to a linear equation, such that the recovered signal is 'robust,' in some sense. If provided with a signal $\underline{w}$ and it is desired to approximate it (i.e., recover), $\underline{v}$, so that the derivatives are approximately the same, the following Equation may be used:

$$\min_{\underline{v}} \|D\underline{v} - D\underline{w}\| + \lambda f(\underline{v}, \underline{w}) \qquad \text{(Eqn. 5)}$$

A new vector $\underline{v}$ (or signal, image, etc.) is sought that is close to the original $\underline{w}$, in the sense that their derivatives are similar, but where the solution is also regularized. Here, f( ) is a function that computes, in some sense, the difference between $\underline{v}$ and $\underline{w}$. If $\lambda \rightarrow 0$, then the minimization returns $\underline{v} = \underline{w}$ up to an additive constant (because they are being differentiated, and the derivatives of two signals that are only an additive scalar apart are the same). More generally, $\lambda$ is a user-defined term that controls how important it is to minimize the regularization term. As $\lambda$ becomes larger, then a $\underline{v}$ is found that minimizes $f(\underline{v},\underline{w})$.

According to some embodiments, Eqn. 5 may be regularized to find a closed-form solution for the output signal $\underline{v}$, given knowledge of the input signal, $\underline{w}$. Next, a new derivative operator, referred to herein as an epsilon derivative operator $D^\epsilon$, may be solved for, such that $D^\epsilon \underline{w} = \underline{v}$ (recalling that $\underline{v}$ is the solution of Eqn. 5). That is, in the steps set forth, the regularization concept of Eqn. 5 is leveraged as a way to 'solve for' a new derivative-type operator that, by definition, directly implements the desired regularization (and, thus, no explicit regularization is required). In image-based regularization, the penalty term $\lambda$ may be varied to achieve the desired results. By contrast, the regularization that leads to the novel derivative operator disclosed herein may be fixed.

Considering the regularization function, f( ), further, one form of regularization is to try and recover a signal that is similar to a known outcome. For example, in "shape from shading," the idea is to recover the surface normal at each pixel location. Based on these surface normals, by mathematical means alone, a synthetic image may be generated. In fact, to make the problem soluble, a constraint used in shape from shading is that the synthetic image prediction is close to the original image. This brightness consistency or 'data term' (in Euler Lagrange theory) is commonly used in computer vision. Thus, recovering a signal that is close to a given image is a form of regularization.

Regularization as described herein, i.e., differentiation where the derivative should be consistent with the original brightness, may be formally stated as:

$$\min_{\underline{v}} \|D\underline{v} - D\underline{w}\|^2 + \lambda \|D\underline{v} - \underline{w}\|^2. \qquad \text{(Eqn. 6)}$$

Eqn. 6 suggests that the regularization is used to solve for a brightness image coded as $\underline{v}$, such that its derivative is close to the original brightness image, $\underline{w}$. As mentioned above, the regularization term is conditioned by the variable, $\lambda$, which is typically small. This is, in effect, causing the derivative to be a little bit related to the original brightness itself.

There are many circumstances where solutions are sought that are close to the data started out. Assuming the (arbitrary) matrices A and B are M×N matrices (N>M), then the following minimization is the so-called 'linear' restriction of the so-called earth-mover's distance (EMD):

$$\min_T \|TA - A\|^2 + \lambda \|TAA^t T^t - BB^t\|^2. \quad \text{(Eqn. 7)}$$

In Equation 7, a mapping, T, is sought that makes A as close to itself as possible, with the constraint that the M×M raw cross-product, $TAA^tT^t$, matrix (which records data covariance) is similar to the raw cross-product, $BB^t$, of the target image data. For this particular problem, generally, $\lambda \to \infty$, in which case the raw-cross product constraint becomes an algebraic condition that must be met. As may now be appreciated, Eqns. 6 and 7 are similar, with one distinction being that, in Eqn. 6, the regularization term is linear and, in Eqn. 7, the regularization term is a non-linear constraint.

Eqn. 6 may be solved by differentiating and equating to the zero vector, i.e.:

$$\Rightarrow D^t D\underline{v} - D^t D\underline{w} + \lambda D^t D\underline{v} - \lambda D^t \underline{w} = 0 \quad \text{(Eqn. 8)}.$$

Rearranging Eqn. 8 results in:

$$[D^t D + \lambda D^t D]\underline{v} = D^t D\underline{w} + \lambda D^t \underline{w} \quad \text{(Eqn. 9)}.$$

Eqn. 9 implies that $\underline{v}$ equals:

$$\underline{v} = \frac{1}{1+\lambda}\underline{w} + \lambda [D^t D + \lambda D^t D]^{-1} D^t \underline{w}. \quad \text{(Eqn. 10)}$$

By reinterpreting Eqn. 10, a new derivative-type operator, $D^\in$, may be defined, such that:

$$D^\epsilon \underline{v} = \frac{1}{1+\lambda}[D + \lambda D[D^t D + \lambda D^t D]^{-1} D^t]\underline{w}. \quad \text{(Eqn. 11)}$$

Eqn. 11 also implies that:

$$D^\epsilon \underline{w} = \frac{1}{1+\lambda} D\underline{v} + \frac{\lambda}{1+\lambda}\underline{w} \quad \text{(Eqn. 12)}$$

As stated earlier, in the discrete domain, each row of the conventional derivative operator, D, may have two values, e.g., [−1 1] (which computes a derivative at a given location in the 1D signal). According to Eqn. 12, each row of $D^\in$ has, along the diagonal, the kernel [−k,1] (e.g., instead of [−1 1]), where k=1/(1+λ).

If, instead, a discrete derivative defined as [−1 1] or [−2 2] were used, then the result of minimizing Eqn. 3 would be the same. Using a least-squares method, the solution $\underline{x}$ that minimizes $\|A\underline{x}-\underline{b}\|$ is actually the same solution that minimizes $\|kA\underline{x}-k\underline{b}\|$. So, without loss of generality, a robust derivative operator may be defined as [−a b], where b>−a. In a preferred embodiment, the robust derivative mask may be defined as [−1 (1+∈)], where ∈>0.

The general form of $D^\in$ may thus be written as:

$$D^\epsilon = \begin{bmatrix} -a & b & & \\ & -a & b & \\ & & & \ddots \end{bmatrix}. \quad \text{(Eqn. 13)}$$

The repeating row structure is shown in Eqn. 13 for the general robust operator. The preferred embodiment described above, i.e., including an epsilon term, is shown below, in Eqn. 14:

$$D^\epsilon = \begin{bmatrix} -1 & 1+\epsilon & & \\ & -1 & 1+\epsilon & \\ & & & \ddots \end{bmatrix}. \quad \text{(Eqn. 14)}$$

To this point, the derivatives discussed herein have been determined by calculating along the x-axis in the image (i.e., from left to right). Of course, an image also has a y-axis. So, the robust derivative may be defined as $[-a\ b]^t$ (where t denotes the vector transpose operation). The preferred robust 'top to bottom' y-derivative operator is thus equal to: $[-1\ (1+\in)]^t$.

The mathematical symbol $\nabla$ denotes the x-derivative and y-derivative of an image (corresponding to the differentiating matrix, D, operating on rows and columns of the image). If the regularized derivative is used, then, when denoting the derivative type operator as $\nabla_R$ (i.e., corresponding to the epsilon derivative operator $D^\in$), the regularized derivative determination of the Look-up-table fit of Eqn. 3 becomes:

$$\min_{\underline{c}} \Sigma_i^k \|\nabla_R P^o(x,y) B_i(x,y)\underline{c_j} - \nabla_R J(x,y)\| + \lambda \|P^o(x,y)\underline{c_i}\| \quad \text{(Eqn. 15)}.$$

In still other embodiments, robust nth-order derivatives by may be computed by convolving a signal successively by the robust derivative mask. For example, in some embodiments, a centered, $2^{nd}$ order, Laplacian may be calculated as follows. An x-derivative is calculated (i.e., from left to right). Then, the $2^{nd}$ derivative in the x-direction is calculated from right to left. That is, the derivative mask [−1 (1+∈)] is applied first in the forward direction and then reapplied (calculating a moving average) in the reverse direction. This 'left-to-right then right-to-left' approach may help to ensure that the $2^{nd}$ derivative is centered at the correct pixel. Convolution operators 'distribute,' so, rather than compute the 'right-left followed by the left-right' convolutions, the masks themselves may simply be convolved.

The mask that computed the discrete $2^{nd}$ derivative in the x-direction is equal to $[-(\in+1)\ 1+(\in+1)^2-(\in+1)]$ (i.e., which is analogous to the non-robust $2^{nd}$ derivative mask [−1 2 −1]). The Laplacian is the sum of the $2^{nd}$ derivatives in the x- and y-directions. So, in a preferred embodiment, the robust Laplacian, $\nabla_R^2$, may be calculated as:

$$\nabla_R^2 = \begin{bmatrix} 0 & -u & 0 \\ -u & 2+2u^2 & -u \\ 0 & -u & 0 \end{bmatrix}, \quad \text{(Eqn. 16)}$$

where, for example, u=∈+1 (as per Eqn. 14).

Sometimes, it may also be convenient to write the derivative kernel as [−0.5 0.5] (since the sum of absolute values equals 1). The corresponding epsilon derivative in such a case may be written as $[-0.5\ (-0.5+\in)]$, and the robust Laplacian may be calculated using Eqn. 16, where $u=\in+0.5$.

Robust Derivative Look-Up Table Reintegration

Returning to the examples illustrated in FIGS. 1 through 3, according to the workflow 200 in FIG. 2, image 100 of FIG. 1 is now mapped to image 150 of FIG. 1 using spatially-varying LUTs that approximate the robust image derivatives, according to the following:

$$\min_{c_i} \Sigma_{i=1}^k \|\nabla_R P^o(x,y) B_i(x,y) \underline{c}_i - \nabla_R J(x,y)\| + \lambda \|P^o(x,y) B_i(x,y) \underline{c}_i\| \quad \text{(Eqn. 17)}.$$

Figure 4:
FIG. 4 illustrates exemplary images showing the application of spatially-varying LUTs to approximate regularized image derivatives, according to one or more embodiments.
Figure 4:

As before, the image may be reconstructed using Eqn. 4, and the resulting image is shown at image 400 in FIG. 4. Image 400 shows that the approximation is reasonable, and some of the more egregious halos have disappeared, but the image's reproduction of the scene could still be more visually pleasing. Recently, it has been argued that the basis functions used in the LUT-reintegration method should not only be spatially-varying (e.g., as in the discrete cosine basis expansion) but instead should also encode something about the content of the image. According to the techniques described in co-owned patent application No. PCT/GB2019/053251 ("the '251 application"), the content of which is hereby incorporated by reference in its entirety, and using 10 brightness-varying basis functions in Eqn. 17, image 450 in FIG. 4 may be calculated, which presents a more visually-pleasing dynamic range compression of the original image.

Eqns. 3 and 4 may be applied to many problems, including image reintegrating derived gradient maps for fused images (e.g., RGB+Near-Infrared and/or multispectral image data). In other words, gradient-based techniques may be used to return a target gradient field, and then the original signal may be added to the gradient image to make it an 'epsilon gradient image.' Then, Eqn. 17 may be used to find the fused image that corresponds to the fused gradient image.

Poisson-Type Epsilon Derivative Computation

Algorithm 1: Solving Gradient Domain Problems Using a Classical Poisson Solver

The classical derivative domain processing for a variety of applications, ranging from lightness computation, to image smoothing, to denoising, to shadow removal can be written as follows:

$$\nabla J = \text{algorithm}(I) \quad 1)$$

$$\hat{\nabla}^2(J) = \text{div}(\nabla J) \approx \nabla^2(J) \quad 2)$$

$$J' = [\nabla^2]^{-1}(\text{div}(\nabla J)) \quad 3)$$

In step 1, x- and y-derivatives are calculated using a desired algorithm over the image, I. As an example, shape from shading algorithms take a typically grey-scale image and calculate the x- and y-derivatives of the corresponding height function of the object in the scene. Given x- and y-derivatives, there usually does not correspond an image J that, when differentiated, yields exactly these derivatives (i.e., the gradient field is not integrable). So, an approximate answer is sought. This approximate answer is found in steps 2 and 3.

First, the x- and y-derivatives are differentiated again (in their x- and y-directions, respectively) and added together. This returns the so-called divergence of the gradient, denoted $\text{div}(\nabla J)$. If $\nabla J$ is integrable, then $\text{div}(\nabla J)$ is equal to the Laplacian of the sought-after image. Notationally, this may be written as $\text{div}(\nabla J) = \nabla^2(J)$. More generally, this is not the case, and so it may be said that the divergence of the gradient is approximately equal to the desired Laplacian. However, it is a classical result that inverting the Laplacian, even for $\text{div}(\nabla J)$, recovers an image whose derivatives are as close to $\nabla J$ as possible, in a least-squares sense. Steps 1 through 3 of Algorithm 1 above are sometimes referred to as "solving a Poisson Equation."

Algorithm 2: Solving Gradient Domain Problems Using an Epsilon Derivative Poisson Solver The analogous 'Poisson-type' solver for epsilon derivatives may be written as:

$$\nabla_R J = \text{algorithm}(I) + \in I \quad 1)$$

$$\hat{\nabla}_R^2(J) = \text{div}_R(\nabla_R J) \approx \nabla_R^2(J) \quad 2)$$

$$J' = [\nabla_R^2]^{-1}(\text{div}_R(\nabla_R J)), \quad 3)$$

where $\nabla_R$ denotes the epsilon x- and epsilon y-derivatives. In step 1, Algorithm 1 returns a normal x- and y-gradient vector. With Algorithm 2, a value of epsilon times the original image is added these gradients. The image is then epsilon-differentiated in the x- and y-directions to calculate the approximate epsilon derivative Laplacian. Inverting this operator (whose kernel is defined in Eqn. 16, above) in step 3 returns the recovered image. With respect to epsilon derivatives, Algorithm 2 is least-squares optimal. That is, the epsilon derivatives of J' are as close as possible to $\nabla_R J$.

If using a screened-Poisson solver, step 3 of Algorithm 1 above may be replaced with: $J' = [\nabla^2 + \lambda]^{-1}(\text{div}(\nabla J) + \lambda I)$. Making this change often makes derivative domain algorithms work significantly better. However, the structure of the implied equations is not the same as epsilon derivatives. Indeed, the kernel for $\nabla^2 + \lambda$ is equal to:

$$\nabla^2 + \lambda = \begin{bmatrix} 0 & -1 & 0 \\ -1 & 4+\lambda & -1 \\ 0 & -1 & 0 \end{bmatrix}, \quad \text{(Eqn. 18)}$$

which is markedly different from Eqn. 16 16.

Further, for screened-Poisson algorithms, the choice of $\lambda$ is highly task-dependent and is used (sometimes per image) to tune the algorithm performance. By contrast, the $\in$ in the epsilon-derivatives described herein is preferably fixed (i.e., it is a function of the operator and not a function of the particular problem or image processing technique at hand). Indeed, for a range of problems, e.g., from dynamic range compression to image smoothing, a single, fixed epsilon (say, $\in=0.1$, or some other value, e.g., between 0.05 and 0.25) may be used with good performance.

Finally, returning to the robust LUT reintegration of Eqn. 17, the epsilon-derivative is calculated for the polynomial expansion of the original image and the target image that is being approximated. This is in contrast to screened-Poisson theory, wherein the target image is modified by adding a fraction of the original image. However, in Eqn. 17, the target image is unchanged (i.e., no part of the original image is added to it). Rather, it is differentiated with a new operator. Thus, it may now be understood that some of the advantages of the techniques disclosed herein result from changing the derivative operator.

Exemplary Image Processing Operations Flowchart

Figure 5:
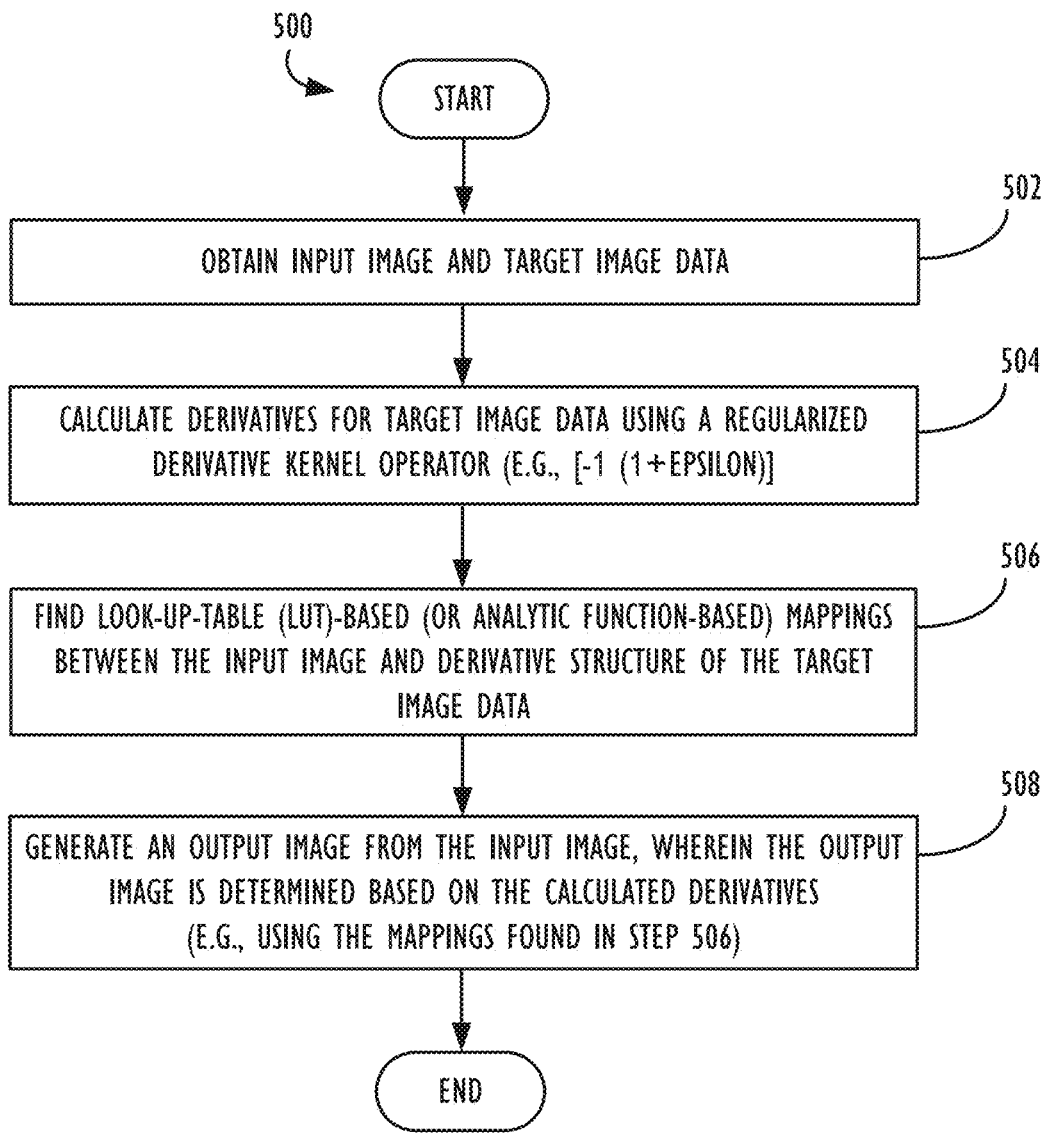
FIG. 5 is flow chart illustrating a method of performing regularized derivative operator image processing techniques, according to one or more embodiments.

Referring now to FIG. 5, a flow chart illustrating a method 500 of performing regularized derivative operator image processing techniques, in accordance with the various detailed descriptions given above is shown. First, at Step 502, the method 500 may obtain an input image and target image data. Next, at Step 504, the method 500 may calculate derivatives for the target image data using a regularized derivative kernel operator (e.g., the aforementioned preferred epsilon derivative operator kernel: [−1 (1+∈)]). According to some embodiments, at Step 506, the method 500 may utilize a Look-up table approach (or analytic functions) determine mappings based on the derivative structure of the target image data. For example, in some cases, the determined mappings may be mappings from the input image determined based on solving a minimization operation attempting to match a derivative structure of the input image to the derivative structure of the target image data. Finally, at Step 508, the method 500 may generate an output image from the input image, wherein the output image is determined based on the calculated derivatives from Step 504, e.g., by applying the LUT-based or analytic function-based mappings determined at Step 506 to the input image.

Exemplary Electronic Computing Devices

Figure 6:
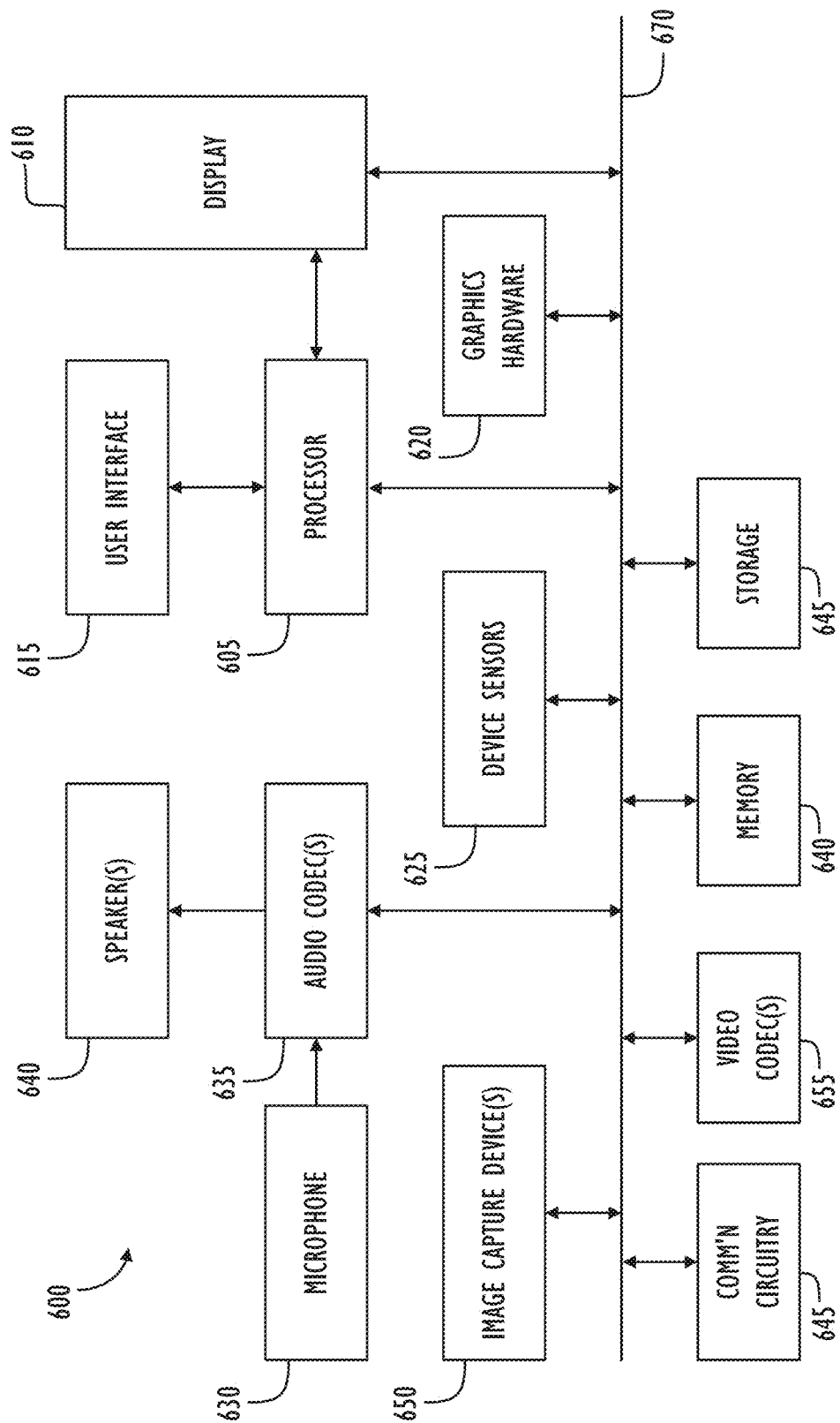
FIG. 6 is a block diagram illustrating a programmable electronic computing device, in which one or more of the techniques disclosed herein may be implemented.

Referring now to FIG. 6, a simplified functional block diagram of illustrative programmable electronic computing device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer, inertial measurement unit, and/or gyroscope), microphone 630, audio codec(s) 635, speaker(s) 640, communications circuitry 645, image capture device 650, which may, e.g., comprise multiple camera units/optical image sensors having different characteristics or abilities (e.g., Still Image Stabilization (SIS), HDR, OIS systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 610 may display a video stream as it is captured while processor 605 and/or graphics hardware 620 and/or image capture circuitry contemporaneously generate and store the video stream in memory 660 and/or storage 665. Processor 605 may be a system-on-chip (SOC) such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/ or one or more specialized SOCs, e.g., an SOC specially designed for image processing and learning operations (e.g., convolutions and statistics gathering) in a more energy-efficient manner than either the main device central processing unit (CPU) or a typical GPU, including Apple's Neural Engine processing cores.

Image capture device 650 may comprise one or more camera units configured to capture images, e.g., images which may be processed to generate enhanced versions of said captured images, e.g., in accordance with this disclosure. Output from image capture device 650 may be processed, at least in part, by video codec(s) 655 and/or processor 605 and/or graphics hardware 620, and/or a dedicated image processing unit or image signal processor incorporated within image capture device 650. Images so captured may be stored in memory 660 and/or storage 665. Memory 660 may include one or more different types of media used by processor 605, graphics hardware 620, and image capture device 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a user interface; and
   one or more processors operatively coupled to the memory, wherein the one or more processors are configured to execute instructions causing the one or more processors to:
   obtain an input image and target image data;
   calculate derivatives for the target image data using a regularized derivative operator, wherein the regularized derivative operator is fixed over the target image data and configured to perform regularization at an individual pixel level; and
   generate an enhanced output image from the input image, wherein the enhanced output image is determined based on the calculated derivatives for the target image data.

2. The device of claim 1, wherein the target image data comprises gradient values.

3. The device of claim 1, wherein the instructions further comprise instructions to:

determine a Look-up table (LUT) comprising mappings from the input image determined based on a derivative structure of the target image data, and wherein the enhanced output image is further determined by using the determined LUT.

4. The device of claim 3, wherein the instructions to determine a Look-up table (LUT) comprising mappings from the input image determined based on a derivative structure of the target image data further comprise instructions to:

determine a Look-up table (LUT) comprising mappings from the input image determined based on solving a minimization operation attempting to match a derivative structure of the input image to the derivative structure of the target image data.

5. The device of claim 3, wherein the instructions to determine a Look-up table (LUT) comprising mappings from the input image determined based on a derivative structure of the target image data further comprise instructions to:

determine a Look-up table (LUT) using downscaled versions of the input image and the target image data.

6. The device of claim 1, wherein the instructions to generate an enhanced output image from the input image data, wherein the enhanced output image is determined based on the calculated derivatives for the target image data further comprise instructions to:

generate an enhanced output image from the input image data, wherein the enhanced output image is determined based on solving a minimization operation attempting to match a derivative structure of the input image to the derivative structure of the target image data.

7. The device of claim 1, wherein the instructions to generate an enhanced output image from the input image data, wherein the enhanced output image is determined based on the calculated derivatives for the target image data further comprise instructions to:

map the input image to the enhanced output image using one or more analytic functions.

8. The device of claim 1, wherein the regularized derivative operator comprises a kernel operator.

9. The device of claim 8, wherein the kernel operator is defined as: [−a, b], wherein b>a (wherein a>0 and b>0).

10. The device of claim 8, wherein the kernel operator is defined as: [−1(1+∈)], wherein ∈>0.

11. The device of claim 10, wherein the ∈ parameter is a controllable system parameter that is independent of a type of image processing being applied to the input image.

12. A non-transitory computer readable medium comprising computer readable instructions configured to cause one or more processors to:

obtain an input image and target image data;

calculate derivatives for the target image data using a regularized derivative operator, wherein the regularized derivative operator is fixed over the target image data and configured to perform regularization at an individual pixel level; and generate an enhanced output image from the input image, wherein the enhanced output image is determined to be an image having derivatives based on the calculated derivatives for the target image data.

13. The non-transitory computer readable medium of claim 12, wherein the instructions further comprise instructions to:

determine a Look-up table (LUT) comprising mappings from the input image determined based on a derivative structure of the target image data, and wherein the enhanced output image is further determined by using the determined LUT.

14. The non-transitory computer readable medium of claim 12, wherein the regularized derivative operator comprises a kernel operator defined as: [−1 (1+∈)], wherein ∈>0.

15. The non-transitory computer readable medium of claim 14, wherein the ∈ parameter is a controllable system parameter that is independent of a type of image processing being applied to the input image.

16. An image processing method, comprising:

obtaining an input image and target image data;

calculating derivatives for the target image data using a regularized derivative operator, wherein the regularized derivative operator is fixed over the target image data and configured to perform regularization at an individual pixel level; and generating an enhanced output image from the input image, wherein the enhanced output image is determined to be an image having derivatives based on the calculated derivatives for the target image data.

17. The method of claim 16, further comprising:

determining a Look-up table (LUT) comprising mappings from the input image determined based on a derivative structure of the target image data, and wherein the enhanced output image is further determined by using the determined LUT.

18. The method of claim 16, wherein generating the enhanced output image from the input image further comprises using a Poisson-type solver operation.

19. The method of claim 18, wherein the regularized derivative operator comprises a kernel operator defined as: [−1 (1+∈)], wherein ∈>0.

20. The method of claim 16, wherein calculating derivatives for the target image data using a regularized derivative operator further comprises:

calculating x-derivatives of the target image data by differentiation using a derivative kernel; and calculating y-derivatives of the target image data by differentiation using a derivative kernel, wherein generating an enhanced output image from the input image further comprises generating an enhanced output image determined to have derivatives based on the calculated x-derivatives and y-derivatives of the target image data.

* * * * *